Patented Mar. 27, 1934

1,952,256

UNITED STATES PATENT OFFICE 1,952,256

SYNTHETIC PRECIOUS STONE

Max Jaeger and Hermann Espig, Bitterfeld, Germany, assignors to I. G. Farbenindustrie Aktiengesellschaft, Frankfort-on-the-Main, Germany No Drawing. Application April 25, 1931, Serial No. 532,984. In Germany April 29, 1930

4 Claims. (Cl. 106—36.1)

The present invention relates to the production of synthetic precious stones and is more particularly concerned with a process for producing a synthetic violet spinel.

According to the present invention a synthetic violet spinel is obtained by incorporating in the raw material mixture usually employed for artificial spinels, which consists of about 85 parts by weight of $Al_2O_3$ and 15 parts by weight of MgO in finely powdered and intimately mixed form, approximately 1.5 percent by weight of iron and about 0.005 percent by weight of cobalt, both in the form of finely dispersed pure metal or in the form of metallic compounds such as oxides. The resulting mixture is then fused in the known manner, preferably by employing an oxy-hydrogen blowpipe, according to Verneuil. The shade of the artificial stone may be varied by correspondingly modifying the absolute and/or the relative quantities of the two colouring ingredients employed, namely iron and cobalt. However, the proportion of the cobalt present should invariably be maintained at between about one tenth and one thousandth part of the iron present.

We claim:

1. A composition of matter adapted to produce when fused a synthetic spinel having a violet colour, consisting of a basic mixture of $Al_2O_3$ and MgO approximately in the proportion of 85 parts of $Al_2O_3$ to 15 parts of MgO, and about 1.5 percent by weight of iron and a quantity of cobalt ranging between one thousandth and one tenth part by weight of the quantity of iron present, incorporated in said basic mixture.

2. A composition of matter adapted to produce when fused a synthetic spinel having a violet colour, consisting of a basic mixture of $Al_2O_3$ and MgO approximately in the proportion of 85 parts of $Al_2O_3$ to 15 parts of MgO, and about 1.5 percent by weight of iron and about 0.005 percent by weight of cobalt, incorporated in said basic mixture.

3. A synthetic violet spinel consisting of about 85 parts by weight of alumina and about 15 parts by weight of magnesia, about 1.5 parts by weight of iron and between about .0015 and about .15 part by weight of cobalt.

4. A synthetic violet spinel consisting of about 85 parts by weight of alumina and about 15 parts by weight of magnesia, about 1.5 parts by weight of iron and about 0.005 part by weight of cobalt.

MAX JAEGER.
HERMANN ESPIG.